(12) United States Patent
Rodriguez Serrano (10) Patent No.: US 8,917,910 B2
(45) Date of Patent: Dec. 23, 2014

(54) IMAGE SEGMENTATION BASED ON APPROXIMATION OF SEGMENTATION SIMILARITY

(75) Inventor: Jose Antonio Rodriguez Serrano, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 346 days.

(21) Appl. No.: 13/351,038

(22) Filed: Jan. 16, 2012

(65) Prior Publication Data
US 2013/0182909 A1 Jul. 18, 2013

(51) Int. Cl.
*G06K 9/00* (2006.01)

(52) U.S. Cl.
USPC ............ 382/105; 382/159; 382/218; 382/305

(58) Field of Classification Search
USPC .................................. 382/105, 159, 218, 305
See application file for complete search history.

(56) References Cited

U.S. PATENT DOCUMENTS

| | | | |
|---|---|---|---|
| 6,470,094 B1 | 10/2002 | Lienhart et al. | |
| 7,430,315 B2 * | 9/2008 | Yang et al. | 382/159 |
| 7,603,000 B2 * | 10/2009 | Zheng et al. | 382/305 |
| 7,970,644 B2 * | 6/2011 | Hedley et al. | 705/13 |
| 8,306,316 B2 * | 11/2012 | Kameyama | 382/159 |
| 8,488,913 B2 * | 7/2013 | Lin et al. | 382/299 |
| 8,582,811 B2 * | 11/2013 | Wu et al. | 382/103 |
| 8,615,113 B2 * | 12/2013 | Lee et al. | 382/118 |
| 2008/0198159 A1 * | 8/2008 | Liu et al. | 345/420 |
| 2010/0226564 A1 | 9/2010 | Marchesotti et al. | |

OTHER PUBLICATIONS

Shi et al., "Automatic License Plate Recognition System Based on Color Image Processing", 2005, ICCSA 2005, LNCS 3483, 1159-1168.*
Russell, et al. "Segmenting scenes by Matching Image Composites" Advances in Neural information processing systems, Jan. 2009, pp. 1-9.
Kochouri, et al. "Multi-modal classification method in heterogenous image databases" Pattern Recognition, vol. 43, No. 12, Dec. 2010, pp. 4077-4088.
U.S. Appl. No. 12/960,018, filed Dec. 3, 2010, Gordo, et al.
U.S. Appl. No. 13/300,124, filed Nov. 18, 2011, Rodriguez-Serrano, et al.
U.S. Appl. No. 13/224,373, filed Sep. 2, 2011, Rodriguez-Serrano, et al.
U.S. Appl. No. 12/890,789, filed Sep. 27, 2010, Sanchez, et al.
U.S. Appl. No. 12/859,898, filed Aug. 20, 2010, Perronnin, et al.
Alves, et al. "Text localization in scene images by morphological filters", SIBGRAPHI, 2009, pp. 1-2.
Ballard. In Readings in computer vision: Issues, Problems, Principles, and Paradigms. Ch: "Generalizing the Hough Transform to Detect Arbitrary Shapes", 1987, pp. 111-122.

(Continued)

*Primary Examiner* — Katrina Fujita
(74) *Attorney, Agent, or Firm* — Fay Sharpe LLP (57) ABSTRACT

A system and a method for image segmentation use segmentation maps of one or more similar images as a basis for the segmentation. The method includes generating an image signature for an input image to be segmented and identifying at least one similar image from a set of images, based on the image signature of the input image and image signatures of images in the set of images. The similarity may be computed after first projecting the image signatures into a feature space where similarity is more likely to agree with segmentation map similarity. The input image is segmented, based on the segmentation map of one or more of the at least one identified similar images.

15 Claims, 7 Drawing Sheets

QUERY

BEST MATCH

QUERY WITH SEGMENTATION OUTPUT (56) References Cited

OTHER PUBLICATIONS

Blaschko, et al. "Learning to Localize Objects with Structured output regression". ECCV 2008, pp. 2-15.
Bottou. "Stochastic learning", Advanced Lectures on Machine Learning, LNAI 3176, 2004, pp. 146-168.
Chang, et al. "Automatic license plate recognition", IEEE Trans. on ITS, 5(1), Mar. 2004, pp. 42-53.
Comelli, et al. "Optical Recognition of Motor Vehicle License Plates", IEEE Trans. on VT, vol. 44, Nov. 4, 1995, pp. 790-799.
Epshtein, et al. "Detecting text in natural scenes with stroke width transform", CVPR 2010, pp. 2963-2970.
Lampert, et al. "Beyond sliding windows: Object localization by Efficient Subwindow search", CVPR 2008, pp. 1-8.
Leibe, et al. "Combined object categorization and segmentation with an implicit shape model", ECCV '04 Workshop on Statistical learning in computer vision, May 2004, pp. 17-32.
Lempitsky, et al. "Image segmentation by Branch-and-Mincut", ECCV 2008, Part IV, LNCS 5305, pp. 15-29.
Marszalek, et al. "Accurate object localization with shape metals", CVPR 2007, pp. 1-8.
Nguyen, et al. "Tensor voting based text localization in natural scene images", IEEE Signal Proceeding Letters, vol. 17, No. 7, Jul. 2010, pp. 639-642.
Perronnin, et al. "Improving Fisher kernel for large-scale image classification", Proc. of the 11$^{th}$ European Conf. on Computer Vision: Part IV, ECCV, 2010, pp. 143-156.
Rowley, et al. "Human face detection in visual scenes", NIPS, Nov. 1995, pp. 875-881.
Verbeek, et al. "Scene segmentation with conditional random fields learned from partially labeled images", NIPS, 2007, pp. 1-8.

\* cited by examiner

IMAGE SEGMENTATION BASED ON APPROXIMATION OF SEGMENTATION SIMILARITY

BACKGROUND

The exemplary embodiment relates to image segmentation and finds particular application in connection with a system and method which uses segmentation information from similar images to segment a selected image.

Image segmentation refers to the partitioning of an image into two or more regions, typically corresponding to different semantic concepts. For example, a photographic image of a beach scene may be partitioned into sand, sea, and sky areas, or a document image may be partitioned into background, pictures, tables, and text. In some cases, segmentation is used for object detection, where the aim is to segment the image into a foreground region, which corresponds to the object of interest, and a background region, which corresponds to the rest of the image. The detected object can then be extracted from the image or a decision made based on the detection.

Automated image segmentation is a useful component of many image-related business processes. For example, photographs of vehicles may be subjected to segmentation techniques to identify the region of the image which corresponds to a license plate. OCR techniques may then be applied to this region to identify the license number or to see if it matches another license plate.

Existing segmentation techniques are based on heuristics which exploit the a priori known characteristics of the object to be segmented, such as characteristics of text. For example, some exploit the frequent presence of horizontal and vertical edges. See, for example, Wonder Alves, et al., "Text localization in scene images by morphological filters," in *SIBGRAPI*, 2009, and Toan Dinh Nguyen, et al., "Tensor voting based text localization in natural scene images," *IEEE Signal Processing Letters*, 17, July 2010. Others rely on high local contrast or constant stroke width. See, for example, Paolo Comelli, et al., "Optical recognition of motor vehicle license plates." *IEEE Trans. on VT*, 44, November 1995; Boris Epshtein, et al., "Detecting text in natural scenes with stroke width transform," in *CVPR*, pages 2963-2970, 2010. These techniques have very narrow applicability, since the prior knowledge of the images of interest is incorporated into the software, and therefore such methods do not generalize well to other segmentation tasks.

Data-driven approaches are more general. A common approach of this type is to extract local descriptors (patches) from images. For example gradient-based keypoint descriptors are extracted at the locations of a dense, regular grid. These can be employed to train classifiers that will estimate the region class for the patches of a new image.

In object detection, a classifier is trained on positive examples, corresponding to sub-images containing the segmented objects of interest, and negative examples, corresponding to sub-images not containing the object. Such a classifier can be used to score all the possible sub-regions of a new image to identify the most probable location of the object.

Such methods resort to multiple local classification steps in order to obtain the segmentation map and can thus be computationally expensive.

The exemplary embodiment provides a segmentation method which enables object detection and other segmentation tasks to be performed based on a global representation of an image and a set of images for which segmentation information is available.

INCORPORATION BY REFERENCE

The following references, the disclosures of which are incorporated herein by reference in their entireties, are mentioned:

U.S. Pub. No. 20100226564, entitled FRAMEWORK FOR IMAGE THUMBNAILING BASED ON VISUAL SIMILARITY, by Luca Marchesotti, et al.

U.S. application Ser. No. 13/224,373, filed on Sep. 2, 2011, entitled TEXT-BASED SEARCHING OF IMAGE DATA, by José Antonio Rodriguez Serrano, et al.

U.S. application Ser. No. 13/300,124, filed on Nov. 18, 2011, entitled METHODS AND SYSTEMS FOR IMPROVED LICENSE PLATE SIGNATURE MATCHING BY SIMILARITY LEARNING ON SYNTHETIC IMAGES, by José Antonio Rodriguez Serrano, et al.

U.S. application Ser. No. 12/960,018, filed on Dec. 3, 2010, entitled LARGE-SCALE ASYMMETRIC COMPARISON COMPUTATION FOR BINARY EMBEDDINGS, by Albert Gordo, et al.

BRIEF DESCRIPTION

In accordance with one aspect of the exemplary embodiment, a method for image segmentation includes generating an image signature for an input image to be segmented, identifying at least one similar image from a set of images, based on the image signature of the input image and image signatures of images in the set of images, and segmenting the input image based on a segmentation map of at least one of the similar images.

In accordance with another aspect of the exemplary embodiment, a system for image segmentation includes a signature generator configured for generating an image signature for an input image to be segmented. Memory stores a learned projection matrix for projecting image signatures into a feature space in which projected signature similarity is more likely to correlate with a similarity of segmentation maps of the respective images. A retrieval component is configured for identifying at least one similar image from a set of images, based on the image signature of the input image and image signatures of images in the set of images, the signatures being projected with the projection matrix. A segmentation component is configured for segmenting the input image based on a segmentation map of at least one of the similar images.

In accordance with another aspect of the exemplary embodiment, a method for forming a system for image segmentation includes providing a signature generator for generating an image signature for an input image to be segmented, learning a projection matrix for projecting image signatures into a feature space in which a ranked similarity of pairs of projected image signatures of images in a training set is more likely to agree with ranked similarity of segmentation maps of the pairs of images than a ranked similarity of pairs of image signatures without projection. The projected image signature for each of set of images is stored. The projected image signatures for these images are generated with the learned projection matrix. A retrieval component is provided for identifying at least one similar image from the set of images, the similarity being computed based on the projected image signature of the input image and the projected image signatures of the images in the set of images. The projected image signature of the input image is generated by projecting the input image's image signature with the projection matrix. A segmentation component is provided for segmenting the input image based on a segmentation map of at least one of the at least one similar images.

In accordance with another aspect of the exemplary embodiment, a method for image segmentation is provided in which an output segmentation map for an input image is equal to a segmentation map of a most similar one of a set of images or where the output segmentation map is derived from the segmentation maps of the best ranked K similar ones of the set of images, similarity being based on a projected image signature of the input image and projected image signatures of the set of images using a learned projection matrix.

DETAILED DESCRIPTION

Aspects of the exemplary embodiment relate to a system and method for segmenting an image into a plurality of regions based on a multidimensional global representation of the image (an image "signature") and segmentation information for one or more similar images in a collection of images. The exemplary method uses the similarity of the image representations to identify the one or more similar images in the collection.

In one aspect, the similarity is computed in a new multidimensional space by applying a learned projection to the image signatures. The projection matrix for projecting image signatures into the new feature space can learned iteratively such that a ranked similarity of pairs of projected image signatures of images in a training set is more likely to agree with ranked similarity of segmentation maps of the pairs of images than a ranked similarity of pairs of the original image signatures without using the projection matrix.

By way of example, the method is illustrated in connection with an object identification task, specifically, the identification of a license plate region in a photographic image. However, it is to be appreciated that the system and method may find application in a variety of segmentation-based processes.

The exemplary method for segmenting an image is thus posed as a retrieval problem: given an input image, with an as yet unknown segmentation map, and a set of images in a database, each with an associated image segmentation map, determine the image (or subset of K images) from the database with what is predicted to be the most similar segmentation map to the input image, and then output this segmentation map (or maps) as a basis for segmenting the image.

It has been found that employing the similarity functions used in classical similarity problems may not necessarily recover the images with most similar segmentation maps. Therefore, in one example embodiment, a similarity between image signatures that approximates the similarity between the segmentation maps of the images is computed. For many applications, it is desirable that the image similarity is efficient to evaluate, in order to obtain a segmentation (retrieval) result in a reasonable time.

In an exemplary embodiment, the method first optimizes a projection of the image signatures (specified by a projection matrix A) such that a similarity measure, such as a linear kernel in the projected space, ranks images in a similar manner to a similarity defined in the segmentation map space (which is, in general, non-linear and more complex, and not accessible at runtime). The optimal value of the projection matrix A can be found via a similarity learning algorithm.

Figure 1:
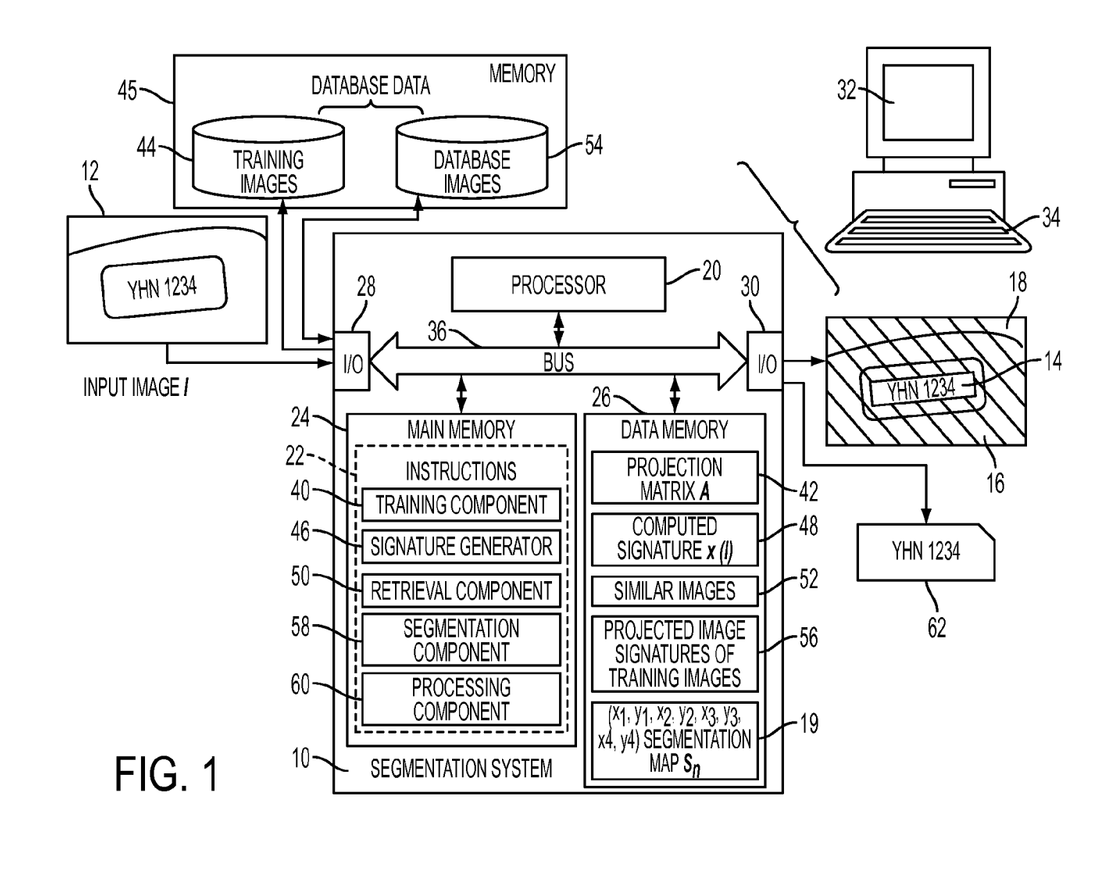
FIG. 1 is a functional block diagram of a system for segmenting images in accordance with one aspect of the exemplary embodiment.

With reference to FIG. 1, a functional block diagram of a computer-implemented system 10 for segmenting images is shown. The illustrated system also learns a projection matrix, however, it is to be appreciated that the learning could be performed by a separate computing device. The computer system 10 is capable of receiving an input image 12 and segmenting the image into two (or more) segmentation regions 14, 16 (illustrated as a license plate foreground region and a shaded, background region). The regions 14, 16, together form a segmented image 18. The regions of a segmented image, or location information extracted therefrom, can be considered as the image's segmentation map 19. Each region is formed by a set of contiguous pixels, which can be labeled with a label to indicate the semantic class of the region.

Figure 2:
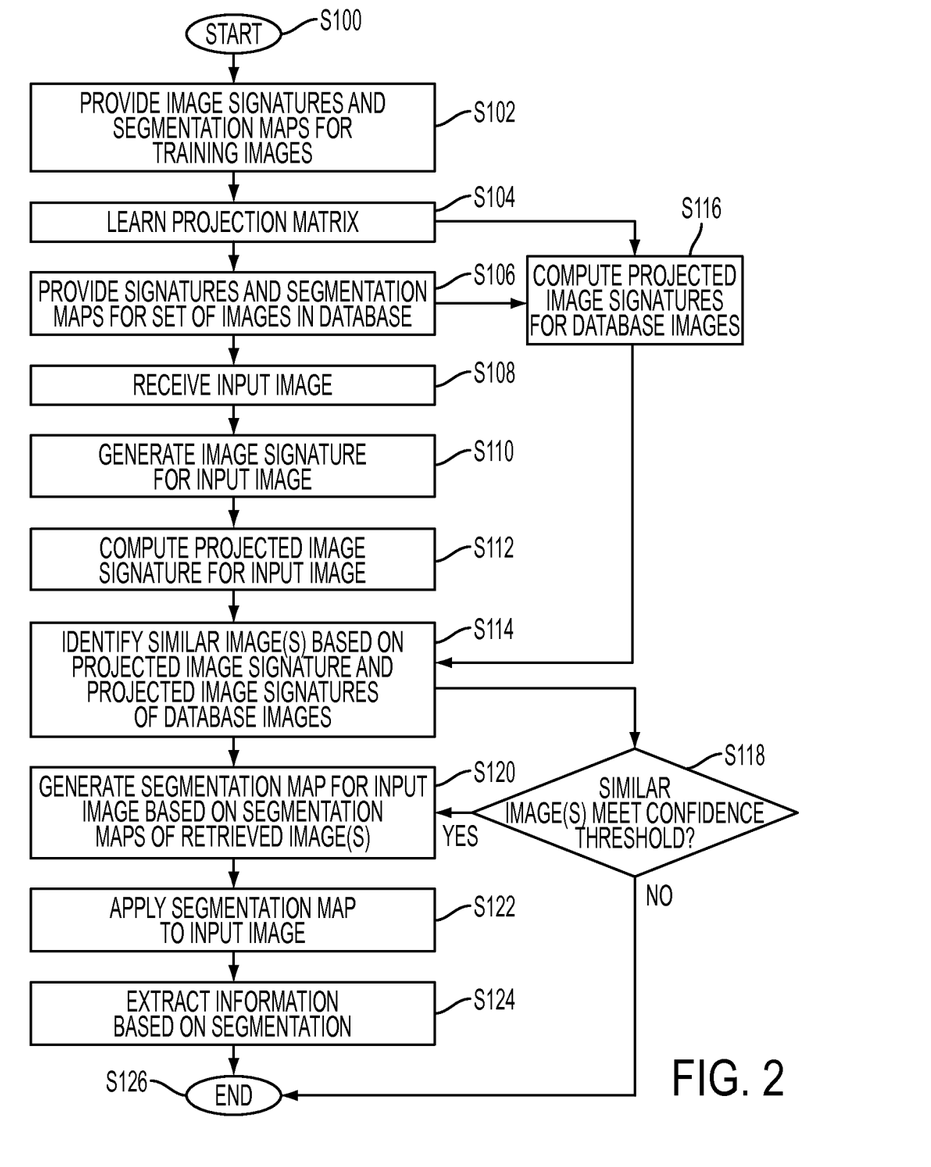
FIG. 2 is a flowchart illustrating a method for segmenting images in accordance with another aspect of the exemplary embodiment.

The illustrated system 10 includes a processor 20, which implements at least a part of the method shown in FIG. 2 by execution of software processing instructions 22 which are stored in memory, such as main memory 24, which is communicatively connected to the processor 20. Processor 20 may also control the overall operation of the computer system 10 by execution of instructions stored in main memory 24. Data memory 26, which may be separate from or integral with main memory 24, stores the input image 12 during processing. Computer system 10 also includes one or more input/output interfaces 28, 30 for communicating with external devices and/or external memory. The interface 28 is configured for receiving the image 12 and may include a modem linked to a wired or wireless network, a portable memory receiving component, such as a USB port, disk drive, or the like. The interface 30 may communicate with one or more of a display 32, for displaying information to users, speakers, and a user input device 34, such as a keyboard or touch or writable screen, and/or a cursor control device, such as mouse, trackball, or the like, for inputting text and for communicating user input information and command selections to the processor 20. The various hardware components 20, 24, 26, 28, 30, 32 of the system 10 may be all connected by a bus 36.

The exemplary instructions 22 include a training component 40 which learns a projection matrix A indicated at 42. The learning is based on a set of training samples, or more particularly based on image signatures (generally, only one per image) and corresponding segmentation maps 19 for a set of segmented training images 44. The training images 44 (or their image signatures) may be stored in local memory 24, 26 or in a remote memory storage device 45. Once the projection matrix A has been learned, the training component 40 can be omitted from the system 10. A signature generator 46 generates a signature 48, such as a multidimensional vector, for the input image 12, and optionally also for the training images 44, if their signatures have not been precomputed. A retrieval component 50 retrieves one (or more) similar images 52 from a database 54 of images, the similarity being computed based on a projection of the image signature of the input image 12, and projections of the image signatures of the database images into a new multidimensional space. The projections of the respective image signatures are computed by applying the computed projection matrix A to the image signatures.

Database 54 may be stored in local or remote memory 45. While two sets of images 44, 54 are shown, it is to be appreciated that their content may be at least partially overlapping and for convenience, they are referred to jointly below as a Database Data. As will be appreciated, once the image signatures of the segmented images 44, 54 have been generated, the original image data is no longer needed. For convenience, precomputed projections 56 of the database images 54 (generated by applying the learned projection matrix A to their image signatures) may be stored in memory for use by the retrieval component 50.

A segmentation component 58 applies the segmentation map(s) of the retrieved similar image(s) 52 to the input image 12 to generate a segmentation map 19 for the input image. The computed map 19 is used as the basis for generating the segmented image 18. Optionally, the system 10 includes a processing component 60 for extracting information 62 from the segmented image 18, such as extracting a sequence of characters which form a license number, from the foreground segmented region 14, in the example embodiment.

The output of the system 10 may be the segmented image 18, its segmentation map 19, and/or information 60 extracted from the segmented image (e.g., the characters identified in the license plate region 14).

In some embodiments, the segmented image 18 may be input to a further segmentation method. For example, a more computationally expensive segmentation technique, such as a graph-cut method, may be applied to one of the segmented regions, such as the foreground (object) region 14 to refine the segmentation before outputting/processing with the processing component 60. In other embodiments, the output of a combination of segmentation techniques, which include the exemplary method, may be used as the basis for segmenting the image.

The computer system 10 may include one or more computing devices, such as a PC, such as a desktop, a laptop, palmtop computer, portable digital assistant (PDA), a server computer, cellular telephone, tablet computer, pager, combination thereof, or other computing device capable of executing instructions for performing the exemplary method. For example, the segmentation may be performed on a server computer and the results output to a linked client device.

The memory 24, 26, 45 may be separate or combined and may represent any type of non-transitory computer readable medium such as random access memory (RAM), read only memory (ROM), magnetic disk or tape, optical disk, flash memory, or holographic memory. In one embodiment, the memory 24, 26 comprises a combination of random access memory and read only memory. In some embodiments, the processor 20 and memory 24 may be combined in a single chip.

The digital processor 20 can be variously embodied, such as by a single-core processor, a dual-core processor (or more generally by a multiple-core processor), a digital processor and cooperating math coprocessor, a digital controller, or the like. The exemplary digital processor 20, in addition to controlling the operation of the computer system 10, executes instructions stored in memory 24 for performing the method outlined in FIGS. 2-4).

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 illustrates a segmentation method in accordance with one aspect of the exemplary embodiment. The method begins at S100.

At S102, training data 44 is provided. This includes a set of image signatures and corresponding segmentation maps for an appropriate set of training images, e.g., images with similar visual content to an image 12 which is to be segmented. In the case of the license plate example, the training images include images which include a license plate.

At S104, a projection matrix 42 is learned (by the training component 40), based on the set of image signatures and their corresponding segmentation maps for the training data 44. The aim is to find a projection matrix A such that images with similar projected signatures have similar segmentation maps. As described below, the learning step may be an iterative process in which pairs of the projected image signatures are compared in turn and the projection matrix is updated based on whether the ranking of the pairs, based on the similarity of their projected signatures, is in agreement with a ranking based on the similarity of their segmentation maps. However, other machine learning methods are also contemplated. The final projection matrix 42 is stored in memory 26.

At S106, a database 54 of segmented images is provided. This includes a set of image signatures and corresponding segmentation maps for an appropriate set of images, as for the training images used in S102. In some embodiments, the same set of images is used for both training images 44 and database images 54.

At S108, a new image 12 to be segmented is received. The new image may be resized (e.g., scaled and/or cropped) to the same dimensions as the database images, e.g., to a fixed number of pixels in x and y directions, for ease of computation.

At S110, an image signature 48 is computed for the input image, by signature generator 46. In the exemplary embodiment, the image 12 is not among the images 44 used in training, nor among the images in database 54, although in other embodiments, this situation is not excluded.

At S112, a projected image signature is computed by applying the projection matrix 42, learned at S104, to the image signature 48, computed at S110.

At S114, one or more similar images 52 is/are retrieved from the image database 54 (by the retrieval component 50). This step may include computing a similarity (distance) measure (which, for purposes described herein, may include computing a similarity or a dissimilarity measure), such as a kernel function, between the projected image signature of the input image 12 and the projected image signatures 56 of the database images. An exemplary kernel is a linear kernel, such as the dot product, although other similarity measures are also contemplated, such as the L1 distance, chi-squared distance, or the like may be used. The selection of a suitable similarity measure may depend, in part, on the type of signatures used. The choice of similarity measure may also affect the loss function employed in the training step. The projected image signatures 56 of the database images may have been previously computed using the projection matrix and stored in memory 26 at S116.

Optionally, at S118 a test may be performed to determine whether the computed similarity between the projected signatures of the image 12 and retrieved image(s) meet(s) a predetermined confidence threshold on the similarity. If not, the method may end. Otherwise the method proceeds to S120.

At S120, the segmentation map(s) of the similar database image(s) 52 is/are retrieved and used to generate a segmentation map 19 for the input image. The retrieved segmentation map of the similar database image 52 can be used directly as the segmentation map 19 in the case of a single segmentation map.

At S122, the segmentation map 19 is applied to the image 12 to segment the image.

Optionally, at S124, information is extracted from a segmented region 14 of the segmentation map.

The method ends at S126.

Figure 3:
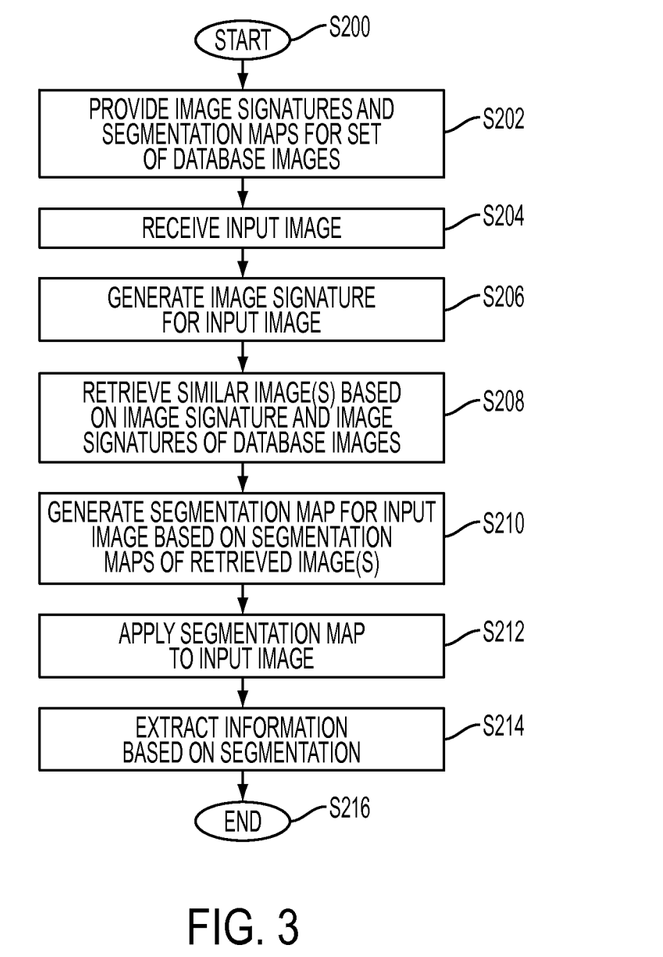
FIG. 3 is a flowchart illustrating a method for segmenting images in accordance with another aspect of the exemplary embodiment.

FIG. 3 illustrates an alternative method which does not rely on the computation of a projection matrix A and wherein similar images are retrieved based on the similarity of their image signatures.

The method begins at S200.

At S202, a database of segmented images is 54 is provided (in particular, the image signatures and corresponding segmentation maps are provided). This includes a set of image signatures and corresponding segmentation maps for an appropriate set of database images, as for S106.

At S204, a new image 12 to be segmented is received.

At S206, an image signature 48 is computed for the input image, by signature generator 46, as for S110.

At S208, one or more similar images 52 are retrieved from image database 54 (by the retrieval component 50). This step may include computing a similarity measure, such as a kernel function, between the image signature of the input image 12 and the image signatures 56 of the database images.

At S210, the segmentation map(s) of the similar database image(s) is/are retrieved and used to generate a segmentation map 19 for the input image, which is applied to the image at S212.

Optionally, at S214, information is extracted from a segmented region 14 of the segmented image.

The method ends at S216.

As will be appreciated, the steps of the method need not all proceed in the order illustrated and fewer, more, or different steps may be performed.

Further details of the system and method will now be described.

Training Data and Database Images

The number of training images 44 may be relatively large, such as at least 1000 or at least 5000 training images and can include up to a million or more images. In general, a larger number of training images can result in a more accurate computation of the projection, particularly when the segmentation maps are irregularly shaped. Methods for computation of image signatures are described below. Generally, the segmentation maps are manually or semi-automatically generated. In a manual case, a user may draw a boundary around one of the segmentation regions which is then labeled as the region of interest. The region's location and shape is stored. In a semi-automatic case, an arbitrary segmentation algorithm is applied to each training image and a user may verify, by visual inspection, that the hypothesized segmentation regions are correct and can manually correct erroneous segmentations. In the case of the license plate example, information such as that the foreground region is defined by a four sided polygon and that it includes OCR-recognizable text may be used, together with a manually input observed license plate number (see example below).

The number of database images 54 may be relatively large, such as at least 1000 or at least 5000 images and can include any number of images, such as up to a million images or more. The more images in the database, the more likely it is that similar images are retrieved.

In one exemplary embodiment, the training images 44 and/or database images 54 are all resized (e.g., scaled and/or cropped) to the same dimensions, e.g., a fixed number of pixels in x and y directions, for ease of computation.

Learning the Projection Matrix (S104)

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

The following notation is introduced for ease of description, bearing in mind that numerals are used for reference in the drawings.

Let x(I) denote a signature extracted from an image I, and let S(I) denote the segmentation map of I, if known. Let $P=\{(x_n,S_n)\}_{n=1}^{N}$ denote a database of N entries, where each entry includes an image signature $x_n=x(I_n)$ and a segmentation map $S_n=S(I_n)$ of an image $I_n$. It may be assumed that each image signature is a D-dimensional vector where each dimension is a real number ($x_n \in R^D$) and that the segmentation map is drawn from a segmentation map space ($S_n \in S$), where S denotes the segmentation map space). The method does not impose any restrictions on how the segmentation maps are encoded. It is assumed that each segmentation map $S_n$ contains any information from which the segmentation map can be uniquely recovered, for example the indices of the pixels belonging to the foreground (or a particular region), the parameters of any shape that delimits the foreground (or a particular region), or any other data structure by which the segmentation of the image is defined. For example, in the case of license plates, the segmentation maps can be represented by a set of 8 values (4 pairs) which are the x and y coordinates of the four corners of a quadrilateral.

Let $\Psi(S,S')$ denote the similarity between two segmentation maps S,S'. Methods for computing the segmentation map similarity are described below.

Given a new signature x(I), the goal is to retrieve entries from the database such that their segmentation map $S_n$ is sufficiently similar to the true segmentation map of I, which can be denoted $\hat{S}=\hat{S}(I)$.

Although similarity between segmentation maps is given by $\Psi(S,S')$, at runtime, the segmentation map S of the input image is unknown and only the image signature information is available for the input image. Thus $\Psi(\hat{S},S_n)$ cannot be evaluated directly. In the exemplary embodiment, it is approximated with a similarity between signatures $k(x,x_n)$. In the embodiment of FIG. 2, a similarity measure of the form:

$$k(x,x_n)=x^T A^T A x_n, \quad (1)$$

is used, where A is a L×D matrix and where T denotes the transpose. Sometimes Eqn. (1) is as $k_A(x,x_n)$ written herein to highlight the explicit dependency of $k(\bullet,\bullet)$ on A. As noted above, D is the number of dimensions in each image signature x(I). L is a real number which can be selected to provide acceptable results while providing an acceptable computation time. In one embodiment, L is less than D, i.e., the projected signature will have fewer dimensions than the original image signature. In general, L is greater than 1 and can be at least 10 or at least 100, such as from D/4 to D/64. For example, for image signatures which are vectors having 64×32×32=65,536 dimensions, a suitable value for L may be 4096.

Using entries from the database 54, or from another annotated training set 44, an optimal value of A that satisfies a desired criterion, such as a loss function, can be estimated.

Note that the similarity defined in Eqn. (1) satisfies the desired efficiency property, since it can be seen as a dot product between the projections Ax and $Ax_n$. As noted, the projection of the database image signatures $Ax_n$ can be pre-computed for all the database items (S116), so that in practice, evaluating Eqn. (1) simply involves computing a projection $(Ax=x^T A^T)$ and a dot product $(Ax \cdot Ax_n)$.

The property sought is that the similarities $k(\bullet,\bullet)$ computed based on Eqn. (1), provide a similar ranking of images in the database 54 as does the computed similarity of the segmentation maps $\Psi(\bullet,\bullet)$. Thus for example, the method should provide that the computed similarity of two image projections correlates with the computed similarity of their segmentation maps. One way to favor this ranking similarity is to consider a triplet $(x_i,S_i)$, $(x_j,S_j)$, $(x_m,S_m)$, such that $\Psi(S_i,S_j)>\Psi(S_i,S_m)$, and impose a constraint that:

$$k(x_i,x_j)>k(x_i,x_m)+q \quad (2)$$

where q represents a margin which can be a fixed positive value or a variable. Eq. (2) means that if sample i is more similar to sample j than to sample m in the segmentation map space, then sample i must also be closer to sample j in the projected signature space. In one embodiment, the margin q may have a fixed value, such as 1. In other embodiments, the margin may be a variable which is a function of the similarity between the segmentation maps. For example, q may be proportional to $\|\Psi(S_i,S_j)-\Psi(S_i,S_m)\|$. It has been found, however, that good experimental results can be obtained with a fixed value of q, such as q=1.

As will be appreciated, a variety of machine learning methods can be used to learn the projection matrix A using Eqns. (1) and (2) and the training data. The following section provides details of an example method for the estimation of the projection matrix using a stochastic gradient descent method, which uses a test and update method to gradually refine the projection matrix.

Training with Stochastic Gradient Descent

The signatures and segmentation maps in the available database Data can be used as training data 44 to estimate A. Given Data, the following loss function measures the mismatch of A with respect to the restrictions imposed by Eqn. 2:

$$L(A) = \sum_{\substack{\forall i,j,k \\ s.t. \ \Psi(S_i,S_j)>\Psi(S_i,S_k)}} \max(0, k_A(x_i, x_k) + 1 - k_A(x_i, x_j)). \quad (3)$$

Figure 4:
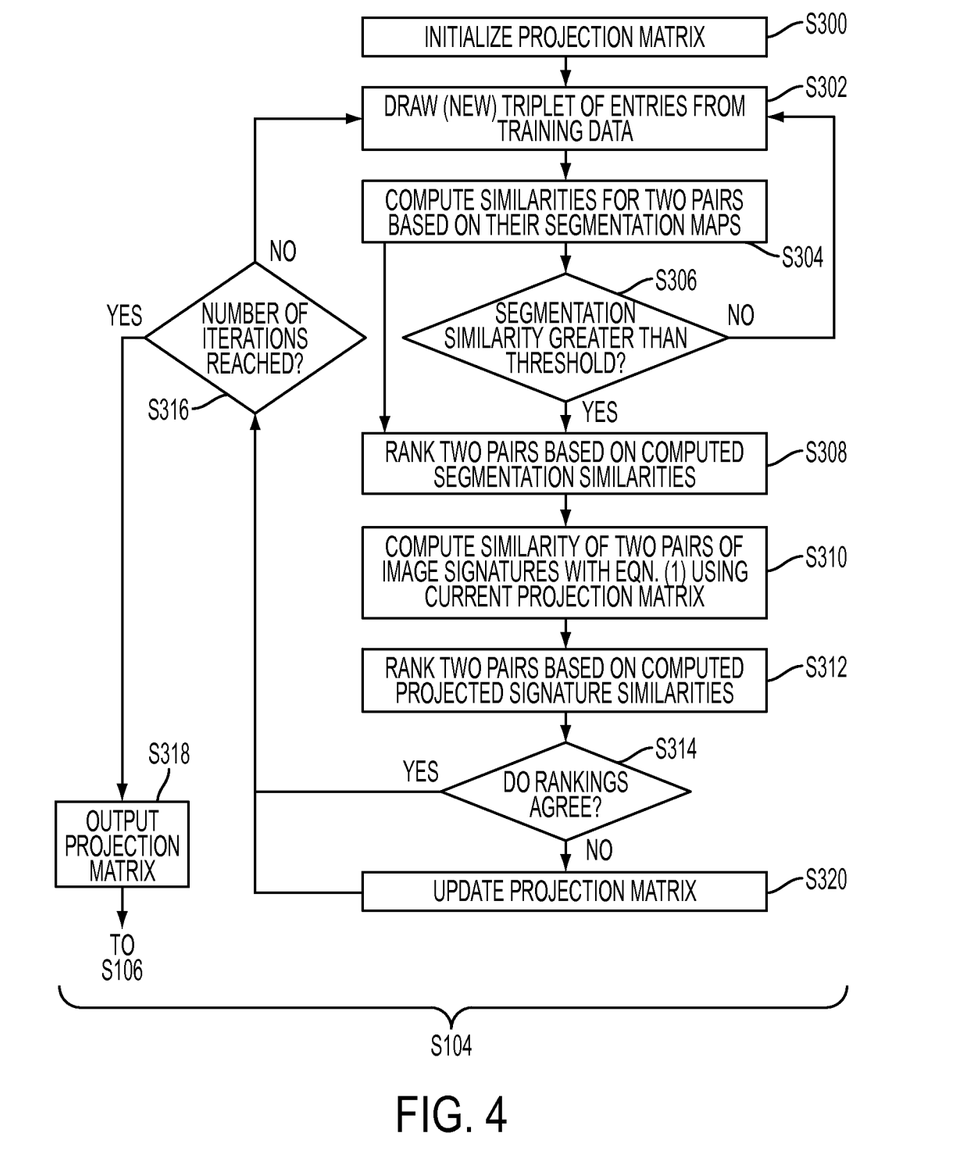
FIG. 4 illustrates generation of a projection matrix in the exemplary segmentation method of FIG. 2, in accordance with one aspect of the exemplary embodiment.

The goal of the training (S104) is to find the projection matrix A that minimizes L(A). Minimization can be achieved by using an iterative process, such as stochastic gradient descent. See, for example, Léon Bottou, "Stochastic learning," in *Advanced Lectures on Machine Learning*, Lecture Notes in Artificial Intelligence, LNAI 3176, pp. 146-168 (Olivier Bousquet and Ulrike von Luxburg, Eds., Springer Verlag, Berlin, 2004). Rather than attempting to optimize the loss function over all possible pairs of entries in the database simultaneously, the gradient descent method takes pairs of entries and determines whether the current projection matrix ranks them correctly, i.e., in the same ranking order as the segmentation map similarity, and if not updates the projection matrix. This can be summarized as shown in FIG. 4.

At S300, the projection matrix is initialized with a set of values. These can be quite arbitrary. For example, the initial values in the matrix are drawn at random from a normalized distribution with a mean of 0, i.e., the values sum to 0. In other embodiments, the initial values are all the same, or are drawn from a projection matrix previously created for another segmentation task.

At S302, a triplet of entries is drawn. The triplet can be drawn at random from the training data, or according to any suitable selection algorithm.

At S304, the segmentation similarity of each of the two pairs of entries in the triplet is computed, based on the segmentation maps.

In one embodiment, at S306, a threshold on the similarity is imposed on the triplets selected, e.g., such that $\Psi(S_i,S_j)>\theta$ and $\Psi(S_i,S_k)<\theta$, where $\theta$ is a threshold on the segmentation similarity. For example, $\theta=0.8$ may be used. If the threshold is not met, the method returns to S302, where a next triplet is drawn. If the threshold is met, the method proceeds to S308.

At S308, the two pairs in the triplet are ranked based on their segmentation similarity. For example, the pair with the highest similarity is ranked highest, e.g., 1, and the other pair is ranked lowest, e.g., 2.

At S310, Eqn. (1) is used to compute the similarity of each pair of entries in the triplet, based on their projected signatures, using the current projection matrix.

At S312, the two pairs are again ranked, this time based on the similarities computed at S310.

At S314, the rankings computed at S308 and S312 are compared to see if they agree, which may include evaluating if the constraint in Eqn. 2 is met. If the rankings are the same and Eqn. (2) is satisfied, then at S316, the method returns to S302, unless some termination criterion is met, such as a fixed number of iterations have been performed in which case the projection matrix is output at S318. If at S314, the rankings do not agree (the constraint in Eqn. (2) is not met), the method proceeds to S320, where the projection matrix is updated and the method returns to S316.

Thus, if a triplet of items from the dataset Data is in accordance to the ranking of Eqn. (2), the partial loss incurred by the triplet is 0, otherwise a positive cost is paid for ranking incorrectly.

In the exemplary method therefore, at each iteration, a random triplet is chosen (S302) and the condition in Eqn. 2 is tested. If the inequality is satisfied, the loss is 0, and a new iteration starts. If the inequality is not satisfied, the samples are not correctly ranked and the projection matrix A is updated at S320 based on a gradient step. In one example embodiment, when the similarity k is the dot product, the following gradient update may be used for updating A at S320:

$$A \leftarrow A + \lambda A (x_i d^T + d x_i^T), \quad (4)$$

where $d=x_j-x_k$, T represents the transpose, and $\lambda$ is a constant or decreasing learning rate that controls the strength of the update. If $\lambda$ is large, e.g., close to 1, then A is updated more rapidly but the iterations may result in rather wild fluctuations. In one exemplary embodiment, λ is a constant and has a value of less than 0.1, such as about 0.01. This updates each of the values in the projection by a small amount as a function of the learning rate and the difference d between the image signatures.

The difference between two vectors is a vector where each element is the difference per dimension. As a simplified example, if a vector is:

$$x = \begin{pmatrix} 1 \\ 3 \\ 1 \end{pmatrix}$$

then x transpose is xT=[1 3 1] and the L×3 matrix is updated as follows. The second term $\lambda A(x_r d^T + dx_i^T)$ in Eq. 4 is computed to generate an L×3 updating matrix. Then, each (row, column) of the matrix A is updated as the old (row, column) of matrix A, plus the corresponding (row, column) of the updating matrix.

The process may be stopped, for example, after a fixed number of iterations or when another convergence criterion is obeyed.

Retrieval of the Best Segmentation Map(s) (S114)

Once A has been estimated, the similarity k(,) between projected signatures can be used as a proxy for Ψ(•,•) in order to retrieve the entries from the database with most similar segmentation maps or maps to an input image I. Two methods are proposed by way of example:

1. Top-1 Selection

In one embodiment, the index of the most similar segmentation map $n^* = \arg_{max_n} k(x, x_n)$, based on Eqn. (1), is obtained and the corresponding segmentation map $S_{n*}$ is directly taken as the segmentation output for the input image I 12. This embodiment will be referred to as top-1 selection.

2. Top-K Pooling

In another embodiment, when the representation of $S_n$ is additive, then the K most similar entries in the database can be selected and the segmentation output for I is taken as an optionally weighted average of these K samples, e.g., the segmentation map 19 of the image is computed as:

$$S = \frac{1}{K} \sum_{K_r=1}^{K} w_r S_r,  \quad (5)$$

where r indicates the index of the entry with rank $K_r$, $S_r$ is its segmentation map, and $w_r$ is the weight assigned to this entry. This embodiment is referred to as top K pooling.

In one embodiment, $w_r$ is the value of the similarity computed according to Eqn. (1) between the projected image signature of the input image and the projected image signature for the entry with rank $K_r$, e.g., $w_r = k(x, x_r)$, or is a function thereof.

In one embodiment, the output segmentation map is associated with a confidence value which gives an estimate of its degree of correctness. In the case of the top-1 selection method, the similarity score of the most similar item $k(x, x_{n*})$ can be taken as the confidence. In the case of the top-K pooling, a suitable implementation combines the scores $w_r$, $K_r = 1 \ldots K$ into a single score. Different choices for this combination are: the mean, the maximum and the minimum of the scores. If the confidence value does not meet a predetermined threshold, the method may end, on the assumption that the image is not sufficiently similar to any of the database images for the segmentation to be reliable. This image may be flagged for manual inspection in an otherwise automated process.

Similarity of Segmentation Maps

At S308, the similarity Ψ(S,S') between each pair of the segmentation maps can be expressed as a function of the area of overlap between the respective labeled regions of interest 14 in the segmentation maps S,S'. The similarity Ψ(S,S') can be a function of the ratio of an area of the intersection of the two regions of interest to an area of the union of the two regions of interest. The area of overlap can thus be defined as $$\Psi(S, S') = \frac{\text{Area}(S \cap S')}{\text{Area}(S \cup S')}.$$

In other embodiments, it may be satisfactory to consider only the area of intersection as the similarity Ψ(S,S').

In some embodiments, the regions of interest 14 may each be approximated by a polygon having the same number of sides. For example, in images containing license plates as the region of interest, the region may be approximated by the four points of a quadrilateral which bounds the license plate. In other embodiments, another regular shape may be more appropriate as the approximation of the region of interest, such as a circle or oval. It is also contemplated that an image may have two or more regions of interest, in which case, both regions may be aggregated into the image's region of interest, or each region of interest may be considered separately.

In some embodiments, the two segmentation maps S,S' may be preprocessed by the system 10, prior to the overlap computation, so that they both have the same pixel dimensions.

Segmenting the Image

The segmentation map generated from the top-1 or top-K images is applied to the input image at S122. For example, assuming the input image 12 has the same pixel dimensions as the retrieved similar image(s), the coordinates of the corners of the region of interest or of those pixels indexed as being in the region of interest are applied directly to the input image. In other embodiments, a factor is applied to the segmentation map to allow for differences in dimensions.

Where more than one segmentation map is retrieved in the top-K method, the mean of the segmentation maps can be used. In another embodiment, a weighted average of the segmentation maps is used, where the weight of each segmentation map may be a function of the computed similarity of the projected image signatures. In other embodiments, the minimum area of overlap of (or the maximum area covered by) the segmentation maps of the top-K images is used as a basis for the segmentation map applied to the image 12.

In some embodiments a further segmentation method may be applied, using the image segmentation map thus generated as a guide. For example, a more computationally costly segmentation technique, such as graph-cut, is applied to the foreground segmented region of the image 12.

Images

Images 12 may be received by the system 10 in any convenient file format, such as JPEG, GIF, JBIG, BMP, TIFF, or the like or other common file format used for images and which may optionally be converted to another suitable format prior to processing. Input images may be stored in data memory during processing. The image 12 can be input from any suitable image source, such as a workstation, database, memory storage device, such as a disk, or the like. The images may be individual images, such as photographs, video images, text images, or combined images which include photographs along with text, and/or graphics, or the like. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). In some embodiments, the images may be monochrome or converted to monochrome prior to processing.

Image Signatures

The signature 48, 56 generated by signature generator 46 for each image 12, 52 can be any suitable high level statistical representation of the image, such as a multidimensional vector generated based on features extracted from the image. Fisher Kernel representations and Bag-of-Visual-Word representations are exemplary of suitable high-level statistical representations which can be used herein as an image signature 48. The exemplary image signatures 48, 56 are of a fixed dimensionality, i.e., each image signature has the same number of elements.

For example, the signature generator 46 includes a patch extractor, which extracts and analyzes low level visual features of patches of the image, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image.

The extracted low level features (in the form of a local descriptor, such as a vector or histogram) from each patch can be concatenated and optionally reduced in dimensionality, to form a features vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the local descriptors are emitted. Each patch can thus be characterized by a vector of weights, one weight for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, etc.), characteristic background (e.g., starlit sky, blue sky, grass field, snow, beach, etc.), or the like. Given an image 12, 52 to be assigned a signature 48, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image signature 48 or input to a generative model which outputs an image signature based thereon.

For example, as local descriptors extracted from the patches, SIFT descriptors or other gradient-based feature descriptors, can be used. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA). Signatures can be computed for two or more regions of the image and aggregated, e.g., concatenated.

In some illustrative examples, a Fisher vector is computed for the image by modeling the extracted local descriptors of the image using a mixture model to generate a corresponding image vector having vector elements that are indicative of parameters of mixture model components of the mixture model representing the extracted local descriptors of the image. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described in application Ser. No. 12/890,789 filed on Sep. 27, 2010, entitled IMAGE CLASSIFICATION EMPLOYING IMAGE VECTORS COMPRESSED USING VECTOR QUANTIZATION, by Jorge Sánchez, et al., application Ser. No. 12/859,898, filed on Aug. 20, 2010, entitled LARGE SCALE IMAGE CLASSIFICATION, by Florent Perronnin, et al., and in Jorge Sánchez, and Thomas Mensink, "Improving the fisher kernel for large-scale image classification," in *Proc. 11th European Conference on Computer Vision (ECCV): Part IV*, pages 143-156 (2010), and in Jorge Sánchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any color photograph if the range of interest is color photographs).

Other exemplary methods for computing image signatures are disclosed for example, in the following references, the disclosures of all of which are incorporated herein in their entireties, by reference:

US Pub. No. 20030021481, published Jan. 30, 2003, entitled IMAGE RETRIEVAL APPARATUS AND IMAGE RETRIEVING METHOD, by E. Kasutani; U.S. Pub. No. 2007005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20080317358, published Dec. 25, 2008, entitled CLASS-BASED IMAGE ENHANCEMENT SYSTEM, by Marco Bressan, et al.; U.S. Pub. No. 20090144033, published Jun. 4, 2009, entitled OBJECT COMPARISON, RETRIEVAL, AND CATEGORIZATION METHODS AND APPARATUSES, by Yan Liu, et al.; U.S. Pub. No. 20100226564, entitled FRAMEWORK FOR IMAGE THUMBNAILING BASED ON VISUAL SIMILARITY, published Sep. 9, 2010, by Luca Marchesotti, et al., U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al.; U.S. Pub. No. 20100092084, published Apr. 15, 2010, entitled REPRESENTING DOCUMENTS WITH RUNLENGTH HISTOGRAMS, by Florent Perronnin, et al.; U.S. Pub. No. 20100098343, published Apr. 22, 2010, entitled MODELING IMAGES AS MIXTURES OF IMAGE MODELS, by Florent Perronnin, et al.; U.S. Pub. No. 20100191743, published Jul. 29, 2010, entitled CONTEXTUAL SIMILARITY MEASURES FOR OBJECTS AND RETRIEVAL, CLASSIFICATION, AND CLUSTERING USING SAME, U.S. Pub. No. 20100189354, published Jul. 29, 2010, entitled MODELING IMAGES AS SETS OF WEIGHTED FEATURES, by Teofilo E. de Campos, et al.; U.S. Pub. No. 20100318477, published Dec. 16, 2010, entitled FAST AND EFFICIENT NONLINEAR CLASSIFIER GENERATED FROM A TRAINED LINEAR CLASSIFIER, by Florent Perronnin, et al., U.S. Pub. No. 20110026831, published Feb. 3, 2011, entitled COMPACT SIGNATURE FOR UNORDERED VECTOR SETS WITH APPLICATION TO IMAGE RETRIEVAL by Florent Perronnin, et al.; U.S. Pub. No. 20110040711, published Feb. 17, 2011, entitled TRAINING A CLASSIFIER BY DIMENSION-WISE EMBEDDING OF TRAINING DATA, by Florent Perronnin, et al.; U.S. Pub. No. 20110052063, published Mar. 3, 2011, entitled CONSISTENT HIERARCHICAL LABELING OF IMAGE AND IMAGE REGIONS, by Julian McAuley, et al., U.S. Pub. No. 20110091105, published Apr. 21, 2011, entitled BAGS OF VISUAL CONTEXT-DEPENDENT WORDS FOR GENERIC VISUAL CATEGORIZATION, by Florent Perronnin; U.S. patent application Ser. No. 12/693,795, filed on Jan. 26, 2010, entitled A SYSTEM FOR CREATIVE IMAGE NAVIGATION AND EXPLORATION, by Sandra Skaff, et al.; U.S. application Ser. No. 12/859,898, filed on Aug. 20, 2010, entitled LARGE SCALE IMAGE CLASSIFICATION, by Florent Perronnin, et al.; U.S. application Ser. No. 12/890,789, filed on Sep. 27, 2010, entitled IMAGE CLASSIFICATION EMPLOYING IMAGE VECTORS COMPRESSED USING VECTOR QUANTIZATION, by Jorge Sánchez, et al., Jorma Laaksonen, Markus Koskela, and Erkki Oja, "Pic-SOM self-organizing image retrieval with MPEG-7 content descriptions," IEEE Transactions on Neural Networks, vol. 13, no. 4, 2002; Gabriela Csurka, et al., "Visual Categorization with Bags of Keypoints," European Conf. on Computer Vision (ECCV) Workshop on Statistical Learning in Computer Vision (2004); Perronnin, F., Dance, C., Csurka, G., and Bressan, M., "Adapted Vocabularies for Generic Visual Categorization," in ECCV 2006; Perronnin, F., Dance, C., "Fisher Kernels on Visual Vocabularies for Image Categorization," in Proc. of the IEEE Conf. on Computer Vision and Pattern Recognition (CVPR) (June 2007); Herve Jegou, Matthijs Douze, and Cordelia Schmid, "Hamming embedding and weak geometric consistency for large scale image search," in ECCV 2008; Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009; Herve Jegou, Matthijs Douze, and Cordelia Schmid, "Improving Bag-Of-Features for Large Scale Image Search," in IJCV, 2010; Perronnin, J. Sánchez, and T. Mensink, "Improving the Fisher kernel for large-scale image classification," in ECCV 2010, and Jorge Sánchez and Florent Perronnin, "High-dimensional signature compression for large-scale image classification," in CVPR 2011.

The method illustrated in one or more of FIGS. 2 to 4, or a portion thereof, may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in in one or more of FIGS. 2 to 4, can be used to implement the method for segmenting an image.

Application to License Plate Number Segmentation

In one exemplary embodiment, the method is employed to segment license plate (LP) numbers from LP images 12. In this embodiment, the segmentation regions are license plate "numbers" 14 and "background" 16 and the partition is specified by the set of 4 corners of a polygon which tightly fits the number region. Heavy constraints need not be imposed on this type of images. For example, it may be specified only that the image should contain the entire LP and that the LP should cover a minimum area of the image. In general, the images can present variability in terms of brightness, contrast, plate orientation, size, blur, and the like. Operational variations in terms of different plate types, issuing states' indicia and decorations, or surrounding car parts are also to be expected.

In this embodiment, the signature x may be computed according to the method described in Florent Perronnin, Jorge Sánchez, and Thomas Mensink, "Improving the fisher kernel for large-scale image classification," in *ECCV* 2010, pages 143-156, and in application Ser. No. 12/859,898. This signature may be referred to herein as an improved Fisher vectors (iFV) signature. The iFV signature is useful since in the signature generation method, the image-independent information (background) is approximately discarded from the Fisher vector signature, retaining primarily the image specific information (the license plate in this case). L2 normalization of each signature can be applied. This tends to reduce the dependence of the signature on the size of the foreground object of interest (the license plate in this case). Suitable parameters for the Fisher vectors, such as the number of Gaussians in the GMM, number of elements in the final vector, and so forth can be obtained through testing the method on test samples for which the ground truth segmentation is known. While larger numbers of Gaussians can increase the accuracy, the larger number also increases the computational cost.

The segmentation map S can be represented as a set of four 2-dimensional points corresponding to the corners of a polygon which separates the plate number region from the background region, thus the segmentation map space: $S=R^8$. (R is the set of real numbers from which the coordinates can be drawn).

The similarity between the segmentation maps can be expressed as the area overlap between the two polygons. The area overlap can be defined as $$\Psi(S, S') = \frac{\text{Area}(S \cap S')}{\text{Area}(S \cup S')},$$

i.e., the ratio of the area of the polygon intersection to the area of polygon union.

Since R is an additive space, it is convenient to use the "top K pooling" implementation.

Information can then be extracted from the segmented region, in this case, a license plate number.

Use of Synthetic Training Data

While the exemplary training data is described in terms of actual photographs of license plates, it is also contemplated that some or all of the training data may be artificially generated. For example, the method for synthesizing license plate images described in above-mentioned U.S. application Ser. No. 13/300,124 may be used. In this method, a collection of license plate images is generated. The method allows a synthetic image to be generated for each valid character permutation of each license plate template offered by each issuing authority, or at least a substantial subset of these. Generating license plate images with a sufficient set of geometrical configurations could be a practical solution in absence of a training set or with only a relatively small number of training images.

Without intending to limit the scope of the exemplary embodiment, the following Example illustrates the application of the method to license plate image segmentation.

Example

This example demonstrates the feasibility of the proposed approach in a real segmentation application, and illustrates the benefits of the similarity learning procedure.

Dataset Preparation

A set of images was acquired at different toll plazas. Each of the images contains a view of a vehicle. A process was applied that extracts a reduced image around the license plate area.

A set of these images is selected and a segmentation ground-truth is generated in an automatic manner using existing optical character recognition (OCR) software, as follows:
 (i) images are processed with the OCR software (which automatically generates a segmentation map of any recognized text in the image),
 (ii) if the recognized LP number is identical to the ground-truth value (which is also available), then it is assumed that the segmentation applied in the OCR process must have been correct, and
 (iii) the segmentation maps of the images are extracted from the OCR output data.

With this process, a set of images with associated segmentation maps is obtained. While the segmentation could have been performed by annotating the images manually, it would have entailed a significant effort for such a large number.

For each image, an iFV signature is computed.

These images are split into 3 sets:
 1. Training images 44 (8722 images)
 2. Database images 54 (8013 images)
 3. Testing images 12 (11,358 images)

In all experiments, the images in the Testing set are segmented using the exemplary segmentation-by-retrieval methods of FIGS. 2 and 3, by searching the Database set 54. An image is considered to be correctly segmented if the area of overlap (as defined above) between its true segmentation map and the obtained segmentation map exceeds 80%. This has been validated visually as a good measure of accuracy. Accuracy is reported as the percentage of correctly segmented images.

Experimental Results

The results for the following methods are shown in Table 1:
 1. Retrieval with Projection Learning: using the exemplary segmentation-by-retrieval method with projection learning as described with reference to FIGS. 2 and 4. Improved Fisher vectors are used as the image signatures. Top-1 and Top-K values are reported. In the case of Top-K, the value of K which gave the best results in cross-validation tests is shown.
 2. Retrieval Only: In this method, improved Fisher vectors are again used for retrieval of a set of similar images but without the similarity learning, as illustrated in the method shown in FIG. 3. In this case, the similarity k(,) corresponds to the dot product in the original signature space. The results of this method allow an evaluation of the impact of the learning step to approximate the similarity between segmentation maps. Top-1 and Top-K values are reported. In the case of Top-K, the value of K which gave the best results in cross-validation tests is shown.
 3. Oracle: This assumes a process that always selects the best segmentation map from the Database set 54. Although this is not likely to be achievable in practice, it is a way of determining the accuracy upper bound of the exemplary method.

The experiments also consider a reject option, where a segmentation output is considered as inconclusive if the retrieval confidence is below a threshold. In that case, the accuracy is evaluated using a threshold which corresponds to rejecting 20% of the input images.

For method 1 (the Retrieval with Projection Learning method), the matrix A was estimated on the Training set 44. It was found, in practice, that instead of considering every possible triplet such that $\Psi(S_i,S_j)>\Psi(S_i,S_k)$ (see Eqn. 2), improved results were obtained when additionally imposing a threshold on the similarity: that $\Psi(S_i,S_j)>\theta$ and $\Psi(S_i,S_k)<\theta$, where $\theta$ is a threshold set to $\theta=0.8$ in the example experiments.

Additionally, since all the methods involve parameters (for example, the parameters of the Fisher vectors or the best K of the pooling), multiple cross-validation experiments were first run on the Database set 54 to determine the best parameters. Then, a single run was performed on the test set with the best parameters obtained in the cross-validation phase. In cross-validation mode, each image from the Database set 54 is queried against the remaining elements of the same set, excluding those with the same LP number (since two images with the same LP number may accidentally have exactly the same layout). The parameters found most suitable for the Fisher vectors used in extracting the image signatures were a dense sampling patch size of 32 pixels, 32 Gaussians in the GMM, PCA dimensionality reduction of the patch descriptor to 64 components, and a spatial split of 8×4.

Table 1 shows the experimental results on the Testing set 12.

TABLE 1

Experimental results

| Method | % correct | % correct at rejection rate = 20% |
|---|---|---|
| Oracle | 99.4 | 100.0 |
| Retrieval with projection learning, top-1 | 83.4 | 90.6 |
| Retrieval with projection learning, top-10 pooling | 93.8 | 98.7 |
| Retrieval only (without projection learning) | 66.7 | 73.2 |
| Retrieval only, top-14 pooling | 83.7 | 89.6 |

The following conclusions can be drawn from these results:

The exemplary method obtains a 93.8% performance in the best case (Retrieval with projection learning, top-10 pooling). This means that approximately 15 out of every 16 images are correctly segmented. This is an overall positive segmentation result. The accuracy increases to 98.7% if 20% of the images are rejected, based on their low confidences.

Learning the similarity using projection learning provides a significant improvement in the results over the Retrieval only method suggesting that the projection matrix approach is a valuable tool for good accuracy.

The results with the oracle (close to 100%) show that in the employed database there is almost always an entry with correct segmentation with respect to the query. Thus, with a sufficiently good signature similarity, the general segmentation-by-retrieval approach should be able to correctly segment most images.

Figure 5:
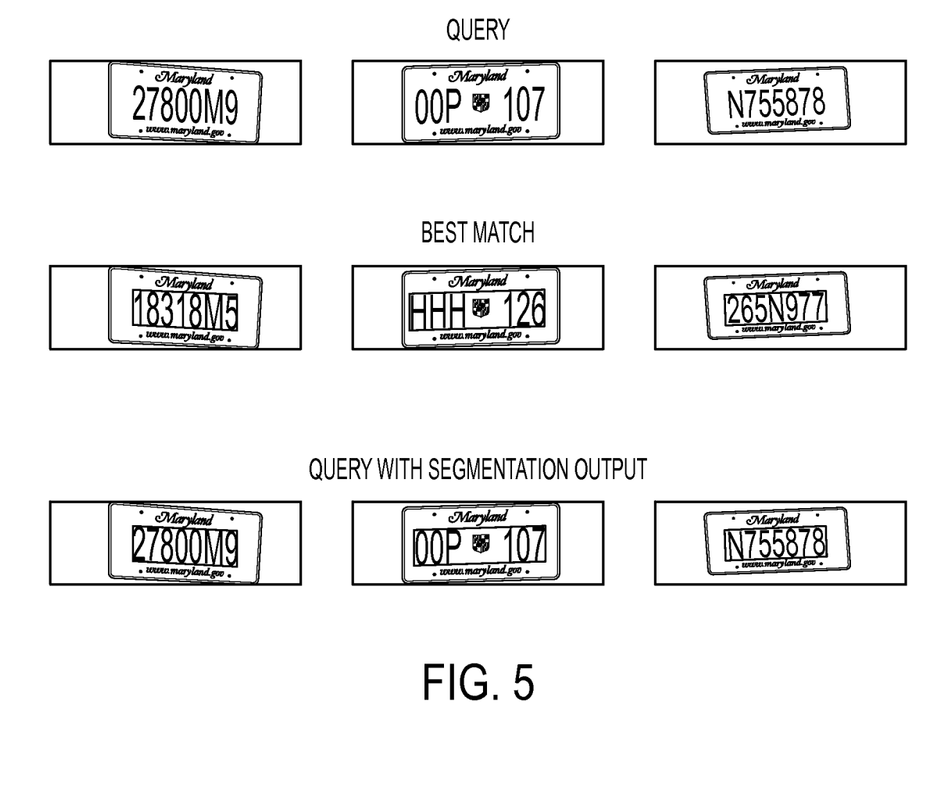
FIG. 5 illustrates a set of input license plate images (queries) (first row), the best match identified for each in an image database using the exemplary method (second row), and the segmented images output by the method (third row)

FIG. 5 simulates the results on example images. First row: original query. Second row: best match retrieved from the database (top-1 image), with its associated segmentation region. Third row: query with overlaid output segmentation region. The true segmentation region closely matched the displayed segmentation region. It can be appreciated how the method selects a plate that is similar in terms of appearance and geometry, and not on LP number information.

Figure 6:
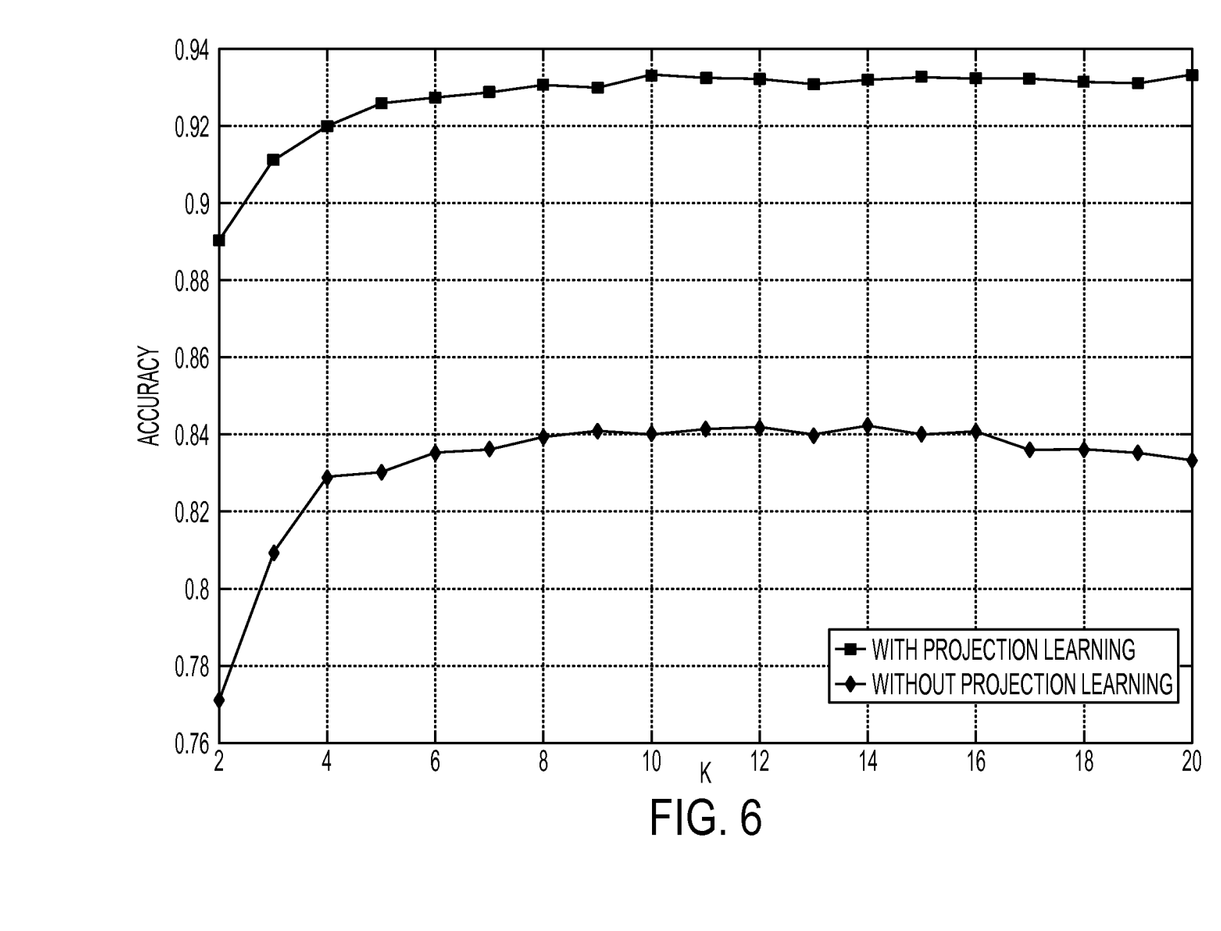
FIG. 6 is a plot illustrating the accuracy of the exemplary top-K pooling method with projection learning and without projection learning.

FIG. 6 shows the accuracy of top-K pooling method on the validation set as a function of K, with and without the learned projection. As can be seen, as the number K in the top-K increases, the accuracy improves, although in all cases, the top K pooling method provides superior results with respect to the top-1 selection method.

Figure 7:
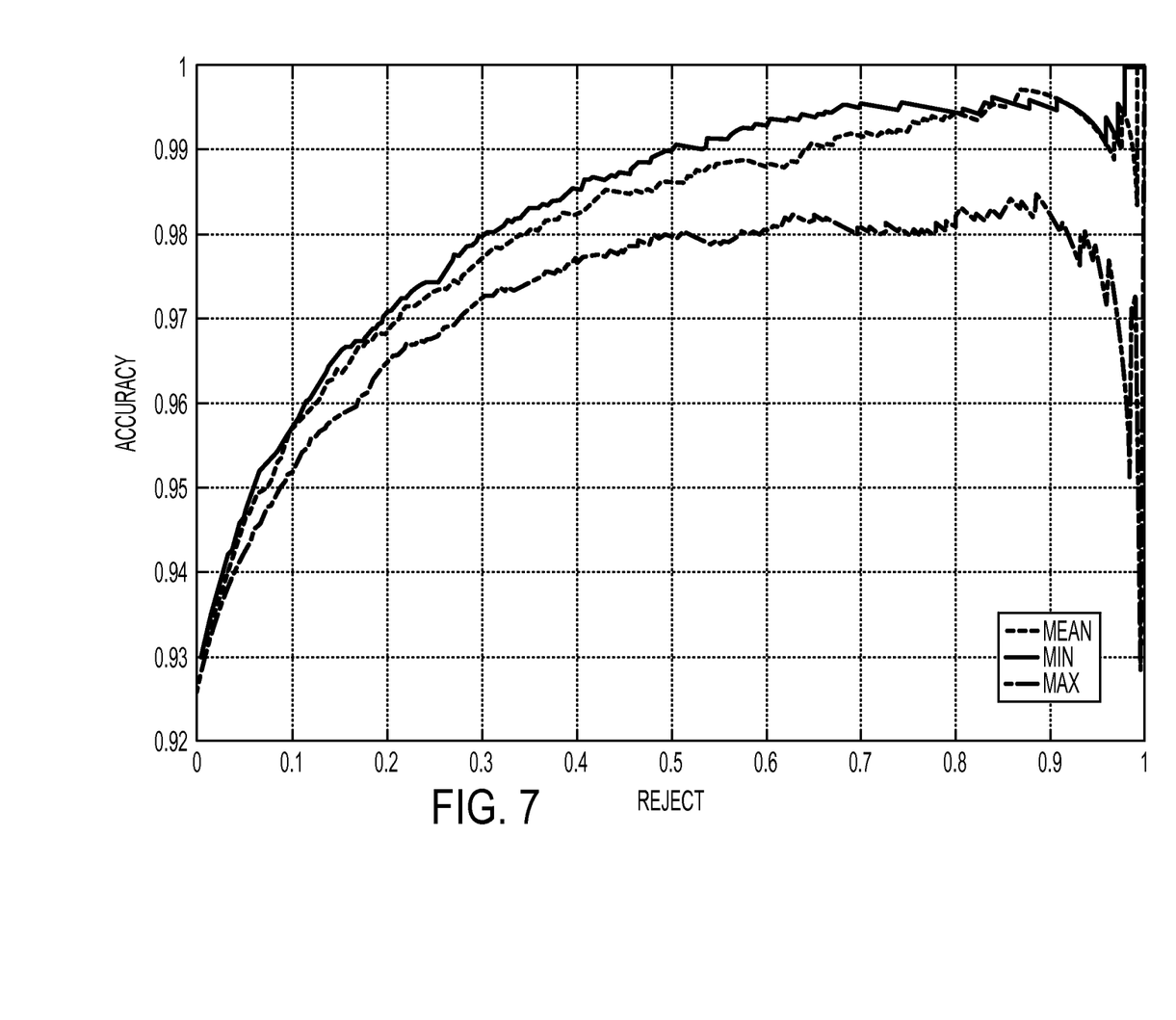
FIG. 7 is a plot showing accuracy of the top-K pooling method using different methods for generating the exemplary projection matrix, for different rejection rates.

In the case of the pooling experiments, experiments were run to determine the best combination from: mean, minimum and maximum on the projected signature similarity (as described above). FIG. 7 shows the accuracy vs. reject trade-off (eliminating a proportion of the results for which the computed similarity is low) for the proposed method, for all three combination choices, and for K=5. While the three choices perform similarly in absence of rejection, the "minimum option" outperforms the others for higher values of the rejection. Thus, a good value to represent the confidence of a set of entries may be the confidence of the weakest one in the retrieved set of images.

It has therefore been shown that accurate segmentation is achieved when the segmentation problem is cast as a single retrieval operation, and where a set of segmented images is ranked according to a function measuring the similarity between segmentation maps. The method is applicable to a wide variety of image types, and is not limited to license plates. The method is efficient since each image is represented only with a single, global feature vector (signature). A similarity between images that approximates the similarity between true segmentation maps is readily learned from an appropriate dataset.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for image segmentation comprising:
    learning a projection matrix using segmentation maps and image signatures of a set of training images;
    generating an image signature for an input image to be segmented;
    projecting the image signature of the image to be segmented into a feature space with the learned projection matrix;
    identifying at least one similar image from a set of images, based on the projected image signature of the input image and projected image signatures of images in the set of images projected with the learned projection matrix, the identifying comprising computing a similarity between the projected image signature and the projected image signatures of the images in the set, wherein the set of images comprises a set of license plate images and respective segmentation maps, each segmentation map including a foreground region, which corresponds to an object of interest, and a background region, which corresponds to the rest of the image;
    segmenting the input image based on the segmentation map of at least one of the at least one similar images, the segmentation including identifying a foreground region of the input image; and
    identifying a license plate number from the foreground region of the segmented input image.

2. A method for image segmentation comprising:
    providing a learned projection matrix learned using segmentation maps and image signatures of a set of training images, the learning of the projection matrix including, for a plurality of iterations:
        drawing a triplet of entries from the set of training images, each entry comprising a segmentation map and an image signature for an image in the training set;
        computing a similarity between a first pair of the entries, based on their segmentation maps;
        computing a similarity between a second pair of the entries, based on their segmentation maps;
        generating a first ranking for the first and second pairs based on the computed segmentation map similarities;
        computing a similarity between the first pair of the entries, based on their image signatures projected with a current projection matrix;
        computing a similarity between a second pair of the entries, based on their image signatures projected with the current projection matrix;

generating a second ranking for the first and second pairs based on the computed projected image signature similarities; and updating the current projection matrix if the first and second rankings do not agree; and after the plurality of iterations, outputting the updated projection matrix as the projection matrix;

generating an image signature for an input image to be segmented;

projecting the image signature of the image signature to be segmented into a feature space with the learned projection matrix;

identifying at least one similar image from the set of images, based on the image signature of the input image and image signatures of images in the set of images, comprising computing a similarity between the projected image signature and projected image signatures of the images in the set of images, projected with the learned projection matrix; and segmenting the input image based on a segmentation map of at least one of the at least one similar images.

3. The method of claim 2, wherein at least one of the generating, identifying and segmenting is performed with a computer processor.

4. The method of claim 2, wherein the generating of the image signature comprises generating a multidimensional vector based on features extracted from patches of the image.

5. The method of claim 2, wherein the identifying comprises identifying the top K most similar images from the set of images, where K is greater than 1.

6. The method of claim 2, further comprising establishing a threshold similarity for segmentation maps and discarding the triplet if one of the first and second pairs does not exceed the threshold.

7. The method of claim 2, wherein the segmenting of the image comprises generating a segmentation map comprising a first region of the image and a second region of the image.

8. The method of claim 2, further comprising providing a threshold similarity for the at least one similar image and, if the threshold is not met by any of the images in the set of images, identifying no similar images.

9. The method of claim 2, wherein the generating of the image signature for the input image comprise generating a single global image signature for the input image and wherein the identifying of the at least one similar image from the set of images is based on the single global image signature.

10. The method of claim 2, wherein the set of images comprises license plate images.

11. The method of claim 10, further comprising identifying a license plate number from a foreground region of the segmented input image.

12. The method of claim 2, wherein the set of images comprises synthesized license plate images.

13. A computer program product comprising a non-transitory recording medium storing instructions, which when executed on a computer, causes the computer to perform the method of claim 2.

14. A system for image segmentation comprising memory which stores instructions for performing the method of claim 2 and a processor in communication with the memory for executing the instructions.

15. A system for image segmentation comprising:

a signature generator configured for generating an image signature for an input image to be segmented;

memory which stores a learned projection matrix for projecting image signatures into a feature space in which projected signature similarity is more likely to correlate with a similarity of segmentation maps of images, the learned projection matrix having been estimated using image signatures and segmentation maps of a set of segmented training images, each segmentation map including a foreground region, which corresponds to an object of interest, wherein the learned projection matrix is learned using segmentation maps and image signatures of a set of training images, the learning of the projection matrix including, for a plurality of iterations:

drawing a triplet of entries from the set of training images, each entry comprising a segmentation map and an image signature for an image in the training set;

computing a similarity between a first pair of the entries, based on their segmentation maps;

computing a similarity between a second pair of the entries, based on their segmentation maps;

generating a first ranking for the first and second pairs based on the computed segmentation map similarities;

computing a similarity between the first pair of the entries, based on their image signatures projected with a current projection matrix;

computing a similarity between a second pair of the entries, based on their image signatures projected with the current projection matrix;

generating a second ranking for the first and second pairs based on the computed projected image signature similarities; and updating the current projection matrix if the first and second rankings do not agree; and after the plurality of iterations, outputting the updated projection matrix as the projection matrix;

a retrieval component configured for identifying at least one similar image from a set of images, based on the image signature of the input image and image signatures of images in the set of images, the signatures being projected with the projection matrix; and a segmentation component configured for segmenting the input image based on a segmentation map of at least one of the at least one similar images; and;

a processor for implementing the signature generator, retrieval component, and segmentation component.

* * * * *